April 25, 1967
J. D. SCOTT
3,316,470
SILICON CONTROLLED RECTIFIER CONTROL CIRCUIT
FOR RECIPROCATING MOTORS
Filed May 3, 1966
3 Sheets-Sheet 1
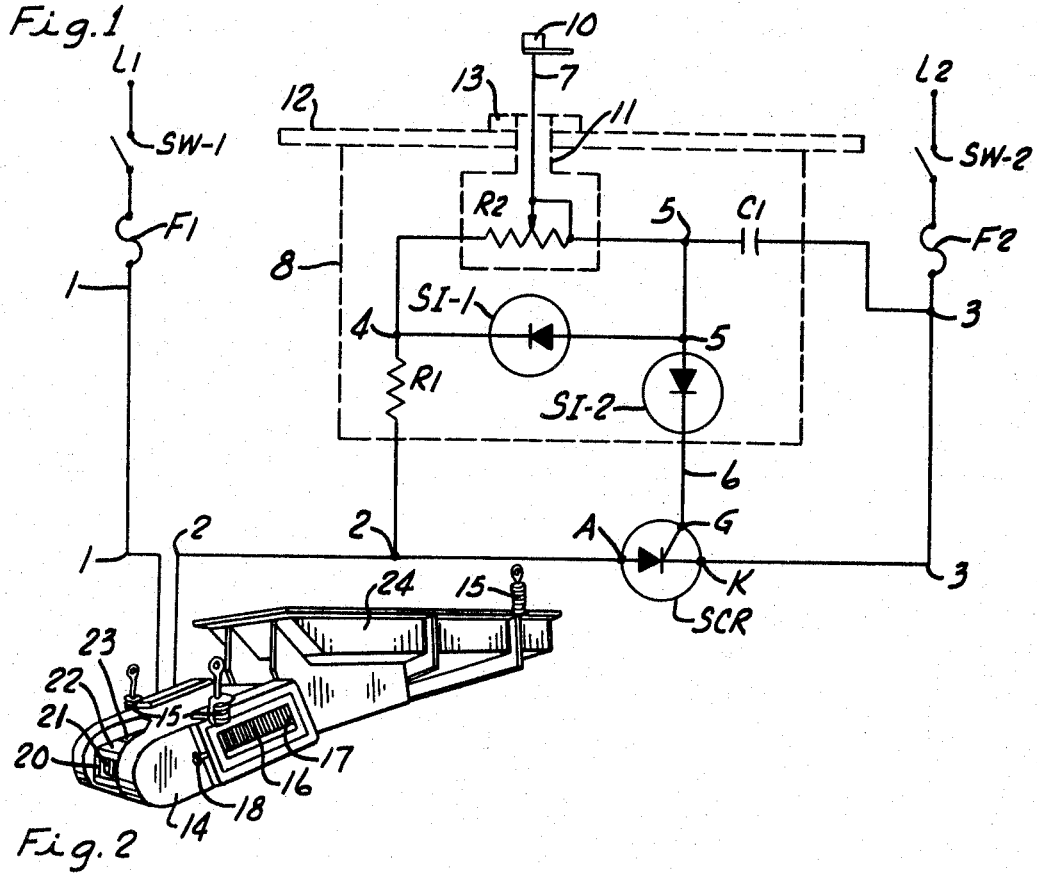
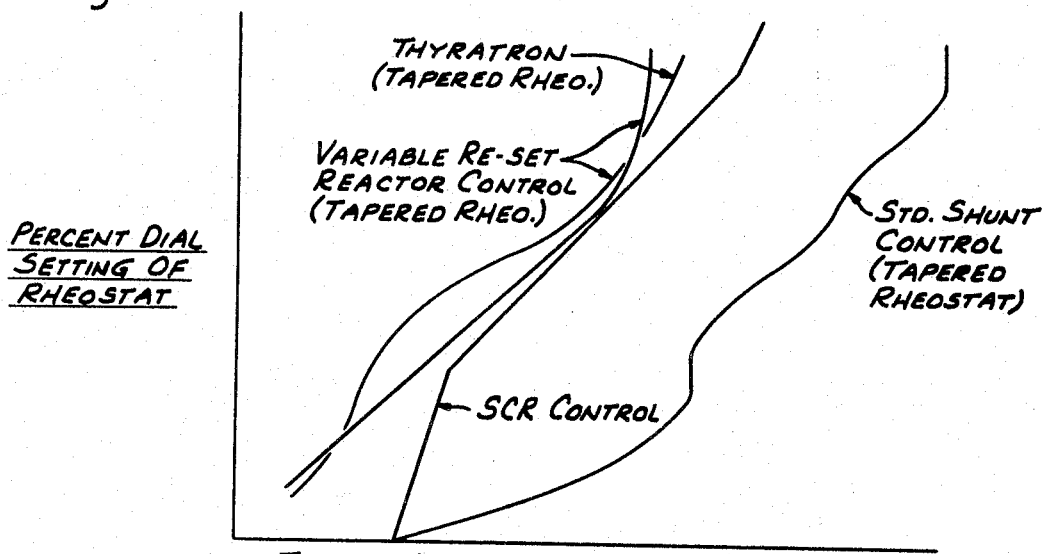
INVENTOR.
J. DENNY SCOTT
BY
CAROTHERS & CAROTHERS
HIS ATTORNEYS April 25, 1967 J. D. SCOTT 3,316,470
SILICON CONTROLLED RECTIFIER CONTROL CIRCUIT
FOR RECIPROCATING MOTORS
Filed May 3, 1966 3 Sheets-Sheet 2

FEEDER
MAGNET COIL

FEEDER
MAGNET COIL

FEEDER
MAGNET COIL

INVENTOR.
J. DENNY SCOTT
BY
CAROTHERS & CAROTHERS
HIS ATTORNEYS

April 25, 1967 J. D. SCOTT 3,316,470
SILICON CONTROLLED RECTIFIER CONTROL CIRCUIT
FOR RECIPROCATING MOTORS
Filed May 3, 1966 3 Sheets-Sheet 3

PERCENT OF POTENTIOMETER "P"

FEEDER AMPLITUDE IN THOUSANDTHS OF AN INCH

NOTE — 100% EQUALS ZERO; 0% EQUALS 2500 OHMS

INVENTOR.
J. DENNY SCOTT
BY
CAROTHERS & CAROTHERS
HIS ATTORNEYS

United States Patent Office 3,316,470
Patented Apr. 25, 1967

3,316,470
SILICON CONTROLLED RECTIFIER CONTROL CIRCUIT FOR RECIPROCATING MOTORS
Junius Denny Scott, 54 Ridge Ave.,
Homer City, Ind. 15748
Filed May 3, 1966, Ser. No. 547,348
2 Claims. (Cl. 318—130)

This disclosure is a continuation-in-part of Ser. No. 311,549, filed Sept. 25, 1963, now abandoned.

This invention relates generally to a variable load control for electromagnetic motors and more particularly to electromagnetic feeder motors for delivering a variable load and utilizing a silicon controlled rectifier by controlling the firing thereof through a resistor and capacitor charge timing circuit to shift the timing of the firing impulse on the gate through a diode.

There are several different circuits for controlling the operation of a variable controllable load such as the electromagnetic motor of a mechanically tuned feeder. Some of these circuits merely contain a variable resistance in power circuit operating the feeder to vary the voltage and thus change the amplitude of the feeder. Some other circuits employ a saturable reactor in series with the power rectifier and the feeder. This type of circuit may also employ a silicon control rectifier reversely connected in multiple with the power rectifier and provided with a circuit to control the firing of the gate of the silicon control rectifier which controls inverse voltage impressed thereon. As a result the degree of saturation of the saturable reactor is maintained. There are also several well-known shut-types of firing or impulse circuits. Each of these control circuits are more expensive in their selection of elements to operate the controllable load. These controls cannot provide a simple lineal control of a feeder load. They do not have a lineal control of the amplitude or speed of the vibratory feeding action.

The principal object of this invention is the provision of a simple circuit using the silicon controlled rectifier as the power rectifier for operating the electromagnetic feeder motor or other controllable load, and a variable resistor-capacitor charge timing circuit to operate the gate and determine the firing timing of the controlled rectifier in operating the load. Two small diodes and a limiting resistor are used in this control circuit with the above mentioned condenser and the variable resistance, the latter of which provides lineal adjustment of the feeder amplitude. To come near such a control would require a toroidal saturable line reactor, a power rectifier and a feeder in combination with a magnetic amplifier having a control winding supplied with direct current to provide for saturating voltage which would be controlled by a variable resistor. The power winding would be electrically connected to a two-leg fullwave diode with one side of an alternating current supply connected between the gate and the cathode of the silicon control rectifier. This equipment is many times more expensive and is not any better as a control. The variable reset reactor control and the thyratron control and the standard shunt control with a tapered rheostat, all known in the art as controls for use in timing of impulse circuits, cannot compare with the linear control of the present invention.

Electromagnetic feeder motors are quite old. They operate with a tuned spring system that has a natural period of vibration. The vibratory motor driving this system must do so at a frequency either above or preferably below that of the frequency of the natural period of the system. Resonant frequency must be avoided to prevent erratic operation.

The tuned spring system for a feeder is generally made up of steel or plastic leaf springs or other forms of rubber such as synthetic rubber or of an elastomer.

Each feeder motor consists of a coil placed on a laminated core mounted on the base or reaction member supported on isolators. The frame which carries the screen, trough or material handling bowl is suspended from the base by a tuned spring system which vibrates the frame to include the action desired on the materials carried by a container on this vibrating frame.

A pulsating power is required to operate these tuned systems. Thus sixty cycle frequency provides one hundred and twenty vibrations per second. To reduce this driving to a more readily controllable operation, only one half of the cycle is used to create a driving vibration of sixty cycles per second. Thus, it is now an advantage to use all kinds of semiconductors for this purpose. The tuned system to be vibrated is adjusted to vibrate at a natural period under full load at one to three or more cycles higher.

In providing a feeder control it must be kept in mind that the first half of the cycle is not usable because it is impossible to even operate the feeder under such conditions. One purchasing a feeder usually buys a capacity somewhat higher than that which is required. This permits the user a greater latitude in control and under normal percentage of feeder operating voltage will be from ninety to one hundred percent. Such a feed would shut off at seventy percent operating voltage and minimum feed may start at seventy-six percent voltage. So the range of operation is limited. Thus, a feeder only uses from seventy percent of the half cycle to the full half cycle.

Again a large feeder may have a natural tuning of four thousand cycles per minute or have a natural frequency period of sixty-six and six-tenths cycles for operating on a voltage of four hundred and sixty volts.

Thus, in the controls of vibratory feeders just any circuit which looks obvious may not function at all.

Other objects and advantages appear hereinafter in the following description and claims.

The accompanying drawings show for the purpose of exemplification without limiting the claims thereto certain practical embodiments illustrating the principles of this invention wherein:

FIG. 1 is a circuit diagram of the control of this invention.

FIG. 2 is a curve illustrating the lineal control through the variable rheostat of this circuit in comparison with the curves of other types of controls.

Figure 8:
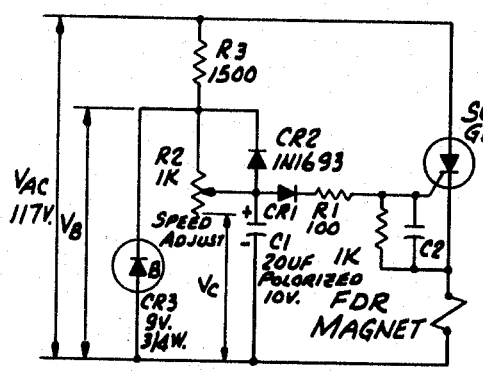
Figure 7:
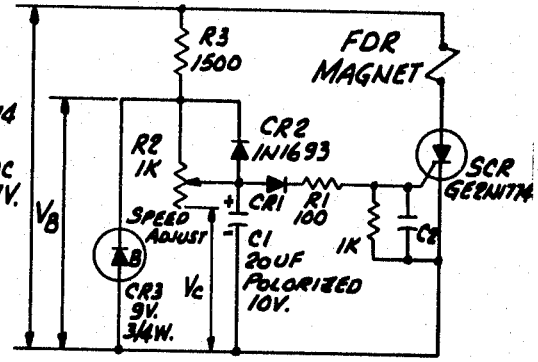

FIGS. 7 and 8 simulate a circuit similar to that illustrated on page 127 of the "GE" SCR Manual, second edition, which was originally intended for adjustment series motor speed control.

Referring to FIG. 1 the alternating current power supply is obtained through the lines L1 and L2 which are controlled by the switches SW1 and SW2 and at least one fuse F1. The power circuit continues through conductor 1 to the variable controllable load indicated by the electromagnetic feeder motor FDR to conductor 2 that is connected to the anode A of the controlled semiconductor rectifier, the cathode K of which is connected by conductor 3 to switch SW2 and thence to the opposite side of the alternating source.

Conductor 2 is also connected to the limiting resistance R1 the other end of which is connected by the conductor 4 to the cathode of the diode SI–1, the anode of which is connected to the conductor 5. Conductor 4 is also connected to one end of the variable resistor R2, the opposite end of which is also connected to the conductor 5.

The conductor 5 is connected to the anode of the diode SI–2, the cathode of which is connected by the conductor 6 to the gate G of the controlled semiconductor rectifier SCR.

The conductor 5 completes the circuit to one side of the condenser C1, the other side of which is connected to conductor 3.

The two resistors R1 and R2, the two diodes SI–1 and SI–2 and the condenser C1 are imbedded in a mastic in a metal box 8 and the three conductors 2, 3 and 6 extend therefrom for connection to their corresponding parts.

These components may, instead of the above application, be encapsulated in an epoxy resin material. This encapsulation replaces the need of a metal box 8 and serves the three-fold purpose of electrical insulation, mounting of individual parts in a fixed relationship when electrically connected and provides a method for mounting this assembly through the use of the threaded sleeve 11. Epoxy resin is chosen for its excellent properties as an insulation, chemical resistance and ability to withstand relatively high temperatures. Also epoxy resin has the ability to adhere to a variety of materials including both metallic and non-metallic surfaces.

The shaft 7 of the resistor R2 extends out of the box 8 to receive the knob 10. The threaded sleeve 11 extends through a hole in the panel 12 and the nut 13 on the sleeve 11 secures the box 8 to the panel 12.

Thus the resistor sleeve supports the box with all the controls which is materially simpler than any other system of control for this purpose.

The resistance R2 is an ordinary variable resistor. It is of the carbon linear tapered type and with this circuit it will produce lineal control of the feeder actuated by the feeder motor FDR in amplitudes as plotted against percent dial setting of the rheostat as illustrated by the graph of FIG. 2.

The electromagnetic feeder motor FDR has been illustrated factually with the use of numbers and legends naming the several parts making up the motor. The reaction base 14 is ordinarily of heavy iron casting which is suspended by the base suspension springs 15. The base contains the transverse leaf springs 16 separated by clamping and spacers and secured by clamping in enclosed windows 17 by means of the clamping bolts 18. With the enclosure housing and casting broken away the electromagnetic E core 20 having the operating coil 21 secured thereto. The armature 22, which in this instance is laminated and not polarized, is secured to the trough clamp 23 secured to the trough 24. The clamp 23 encircles the center of the stack of springs 16 and thus reciprocated back and forth with the armature 22 and trough 23 on the center of the stack of springs 16 clamped at their ends by the bolts 18. This feeder is known as an F55 which may be tuned to four thousand vibrations per minute.

Using 70% of the half cycle voltage in operating vibratory feeders, its operation is nil. It is considered shut off. A minimum feed or dribble would use 75% of this half cycle voltage and from this point to 100% of the half cycle voltage it is important to obtain a uniform and straight line feed control through adjustment by an instrument such as the potentiometer R2 as illustrated in FIG. 2.

FIG. 2 also shows the same curves for other types of control for triggering circuits which do not in any way compare with the lineal control of the SCR controller through the variable resistor R2. There is no substantial variance in feeder amplitude as the rheostat R2 is varied at a uniform rate of dial setting for any incremental dial change anywhere between 0 to 100 percent dial setting of the rheostat. Such is not true of other familiar firing control circuits found in the art. Depending where the rheostat setting is, the feeder amplitude may increase or decrease at a greater or slower rate respectively per equal percent change in the dial setting. As a result, there is difficulty in obtaining a desired feed rate which is necessary in many feeding applications where a constant and exact uniform rate is necessary especially where there is batch feeding, each batch being weighed and fed at a uniform rate. The firing control circuit in this invention provides a simple control, yet possesses uniform and lineal change of rate of the flow of material being fed or conveyed. This control has improved overall operation systems in the vibratory machinery and apparatus industry. The variable reset reactor control employs a tapered rheostat. The reactor in this control is a toroidal reactor in the form of a magnetic amplifier employed to provide the second curve of FIG. 2.

Figure 3A:
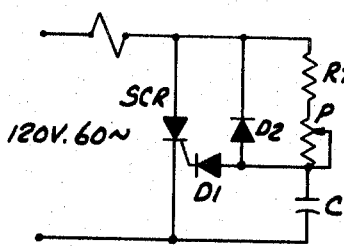
FIG. 3A is a circuit diagram employing an electromagnetic feeder motor in a circuit wherein the fixed resistance is in series with the variable resistance.

FIG. 3A simulates a circuit reference illustrated in a "GE" Newsletter, vol. 1, No. 6, June 1961, p. 7. However, this figure differs from the reference in that a feeder magnet coil motor is substituted for an indicated electric lamp load in the reference. The indicated circuit parts are written on the reference which are as follows:

SCR:GE TN1774         $R_m$:470 ohms
D1:GE 1N678           P:40K ohms
D2:GE 1N681           P:.25 mfd.

Figure 3B:
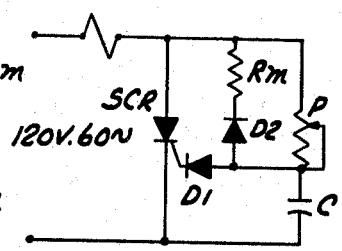
FIG. 3B is a circuit diagram employing an electromagnetic feeder motor in a circuit wherein the fixed resistance is in series with a diode.

FIG. 3B is not suggested by the art and places the resistance $R_m$ in series with D2.

Figure 3C:
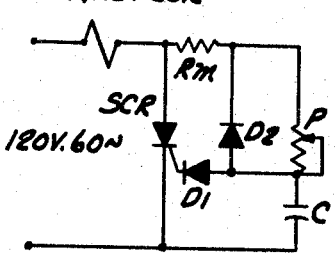
FIG. 3C is a circuit diagram employing an electromagnetic feeder motor in a circuit wherein the fixed resistance is in series with the diode and the variable resistance in parallels as in FIG. 1

FIG. 3C is also not suggested by the art and places the resistance $R_m$ in series with the parallel circuit of D2 and P. This latter circuit is that of applicants control circuit.

Figure 4:
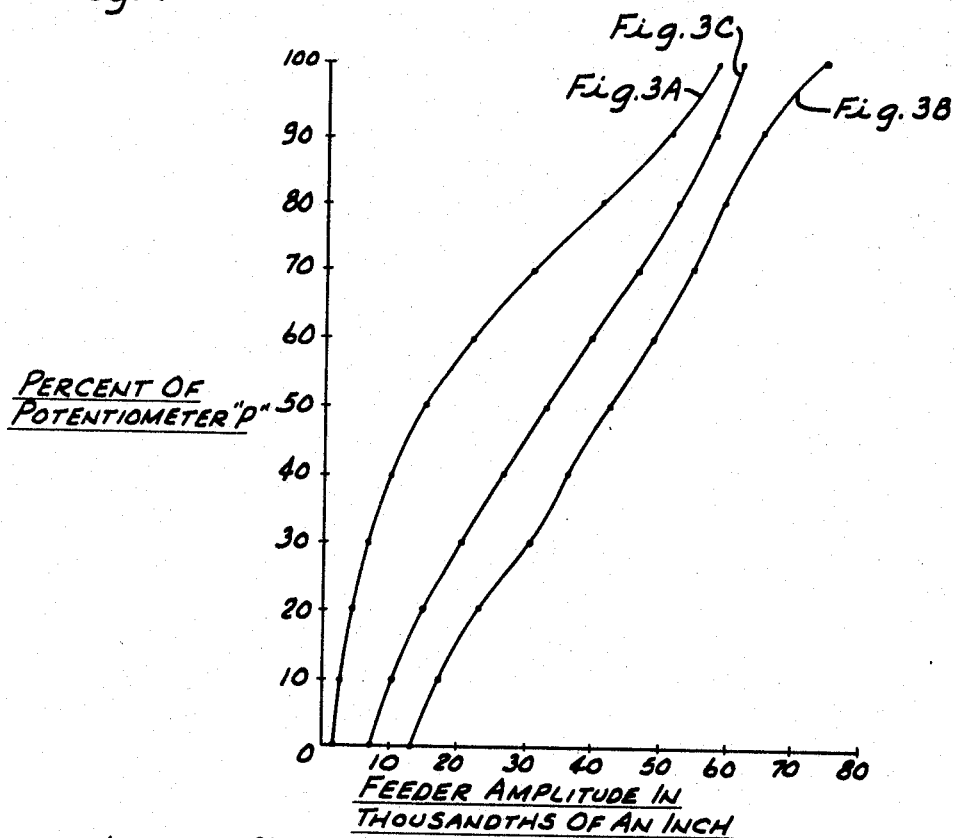
FIG. 4 is a graph showing a series of performance curves for each of the FIGS. 3.

With each of these circuits FIG. 3, FIG. 4 and FIG. 5 energized by a 120-volt 60-cycle source the following tabulation was shown:

| Percent of Rheostat Ohms P | Feeder Amplitude in Thousands of an Inch | | |
|---|---|---|---|
| | Figure 3A | Figure 3B | Figure 3C |
| 0 | 2 | 13.5 | 7.5 |
| 10 | 3 | 17.5 | 10 |
| 20 | 4 | 23 | 15 |
| 30 | 6.5 | 31 | 21.5 |
| 40 | 9.5 | 37 | 27.5 |
| 50 | 15.5 | 43 | 33 |
| 60 | 23 | 49 | 40 |
| 70 | 31 | 55.5 | 47 |
| 80 | 42 | 60 | 52 |
| 90 | 52 | 66 | 58 |
| 100 | 58 | 76 | 61.5 |

These valves are plotted to provide the curves shown in FIG. 4 wtih respect to each of the three circuit arrangements. The circuit of FIG. 3A, which is that of the reference, shows a lower magnitude in the complete range. This shows a very bad curve for lineal control demonstrates that it would be worthless to replace the needed straight line characteristics required by a vibratory electromagnetic feeder motor such as shown in FIG. 2. The curve in FIG. 4 for the circuit of FIG. 3A is considered a very undesirable control.

The curve in FIG. 4 for the circuit of FIG. 3B shows several humps which is also undesirable because one cannot depend upon feeder proportions without a calibrated control dial which changes with operation.

FIG. 3C provides a control curve that is substantially a straight line yet it can be improved as illustrated by the SCR control curve of FIG. 2.

Figure 5A:
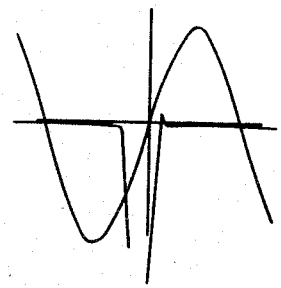
FIGS. 5A, 5B and 5C are oscillograph tracings of the wave form across the capacitor C in the circuit respectively of FIGS. 3A, 3B and 3C when the potentiometer P is fully on or at 100% representing a full conveying feed condition of the feeder with the capacitor volts taken at 5 volts per square as compared to the 60-cycle time wave.
Figure 5B:
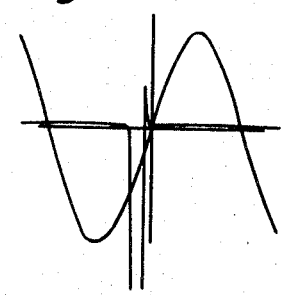
Figure 5C:
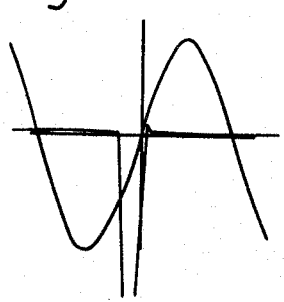

The wave forms across the condenser C shown in FIGS. 5A, 5B, and 5C illustrating the potentiometer P as fully on or at 100% representing a full conveying feed condition for the circuits respectively of FIGS. 3A, 3B, and 3C.

In FIG. 5A the voltage curve across the capacitor is shown to take on a negative voltage which is made to pass off the scale to show the positive blip in the first quarter of the positive half cycle during which time the feeder is operated. At the time of this blip, the SCR is turned on or fired which continues to the end of the half cycle.

In FIG. 5B the blip of the capacitor voltage occurs at or slightly before the beginning of the positive half cycle.

In FIG. 5C the blip occurs below the foregoing positions.

This is indicative of the curves in FIG. 4 wherein curve of 3B is highest, 3C is next and the curve of 3C is lowest.

In considering the three circuits of FIGS. 3A, 3B and 3C the negative voltage on the condenser in FIG. 3A should extend for a longer period of time because D2 is the deciding factor. When D2 has no resistance in series the negative voltage on the condenser is extended and delays the firing which is not good for electromagnetic feeder motor control.

When $R_m$ is in series with D2 and this in multiple with P as in FIG. 3B the negative voltage on C is not extended but this does not provide a straight line control theory potentiometer P as shown in FIG. 4.

When $R_m$ is placed in series with the parallel circuit of D2 and P as shown in FIG. 3C the straight line control becomes evident in FIG. 4 even though the elements chosen for this circuit are actually those written on the reference.

This teaching is found only in applicants disclosure and is not suggested or otherwise taught in the references illustrated.

Figure 6A:
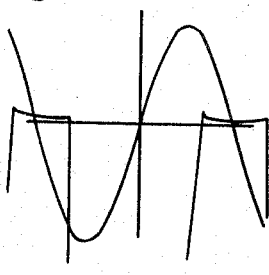
FIGS. 6A, 6B and 6C are oscillograph tracings of the wave form across the capacitor C in the circuits respectively of FIGS. 3A, 3B and 3C when the potentiometer P is fully off or at 0% representing a no-load and no-conveying condition of the feeder with the capacitor volts taken at 5 volts per square as compared to the 60-cycle time wave.
Figure 6B:
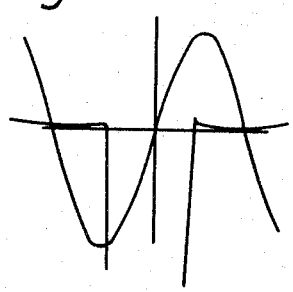
Figure 6C:
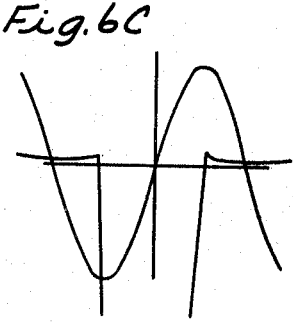

In FIGS. 6A, 6B and 6C the oscilloscope tracings are taken from the condition wherein the potentiometer is fully off representing a no conveying position.

In FIG. 5A the voltage curve across the capacitor becomes changed at the end of the first quarter of the negative half cycle and the blip or firing of the SCR occurs at approximately the last quarter of the positive half cycle this provides only two-thousandths of an inch amplitude. Thus no conveying could be accomplished at this late firing. As a matter of fact an electromagnetic feeder is shut off at 70% of the operating half cycle.

In FIG. 6B the condenser blip occurs about 60% of the positive half cycle. This is not enough to operate the feeder and as shown it provides only about fourteen-thousandths of an inch amplitude.

In FIG. 6C the condenser blip occurs about 50% of the positive half cycle. The condenser voltage continues for approximately a full half cycle providing 50% of the positive half cycle voltage which is insufficient to operate the electromagnetic feeder motor and as shown on the chart in FIG. 4 indicated as FIG. 3C, it provides only about eleven thousandths of an inch amplitude which, of course, is possible to operate the feeder.

Any appreciable feed control would require an operation of at least above 70% of the positive half cycle which might start somewhere around 30% of the potentiometer P as shown in the graph of FIG. 4.

These comparative operating statistics of FIG. 3A, the reference, and the shifting of the resistance of $R_m$ as shown in FIGS. 3B and 3C, is clearly not anticipated by the circuit of FIG. 3A and there is nothing in the disclosure of the reference that would indicate that any shifting or the change in the resistor $R_m$ would be in order for the purpose as taught in this application. It is quite possible that in operating a light load as indicated by the reference the circuit of FIG. 3A would be satisfactory as the load is merely a matter of resistance or lumens and there is little difference whether or not the control operates in a straight line or not.

In FIG. 7, the electromagnetic feeder motor FDR was inserted in the circuit in place of the series field adjacent the anode of the SCR1. Each of the elements as indicated in the circuit were employed including the Zener B, with the exception of the feed-back 1K and C2 which were inserted and were omitted because they added nothing to the circuit in either event.

With the electromagnetic feeder motor FDR positioned in the circuit in place of the series field as shown in FIG. 7, the resistor R1 conducted 250 milliamps providing a peak drop of 25 volts.

Due to the loading of the 100-ohm resistance R1, the Zener voltage dropped and it was impossible to add enough gate current to the control the load greater than 70% voltage operation. Thus, a control was provided between zero and 70% voltage operation. As previously stated, it is insufficient to even operate the electromagnetic feeder. An electromagnetic feeder motor will only begin to operate between voltages greater than 70% of the half way voltage, range being between approximately 75 and 100% of this half wave voltage pulse. The 20-microfarad capacitor caused too much delay in the rise time of the gate voltage which also would prohibit full firing of the SCR. The higher capacity or a mere short across the C1 condenser would permit the electromagnetic feeder motor to operate, but its operation was then erratic and could not be controlled. It would feed spasmodically a cycle or two then stop and feed spasmodically again, which was impossible to control with the potentiometer and no delivery could be obtained.

Referring now to FIG. 8, when the electromagnetic feeder motor FDR was placed in the position of the armature location in the reference, the negative load voltage swing of the SCR prevented the electromagnetic feeder from operating in any position or for any change in the controls and regardless of the feed-back. The negative load voltage swing kills the circuit.

Both of these operating conditions prevailed regardless of whether the feed-back control of the 1K resistance in parallel with the condenser C2 was in place or not lest the feed-back circuit contributed nothing to the operation of an electromagnetic feeder motor.

At no time could a full load operation of the electromagnetic feeder motor be obtained on this half wave control regardless of even the removal of the condenser C1. Thus, at best, the circuit could only provide a dribble feed at 70% operation and never provide a control in view of the fact that our feed control varies between 75 and 100% of the half wave voltage pulse. A dribble is not an accurate control and is not considered a minimum feed. The negative load voltage swing of the circuit in FIG. 8 might permit the SCR to fire for two cycles and then quit for a space of many cycles before firing for two cycles again. Such an erratic or pulsating condition can produce no feeding.

I claim:

1. A feeder supply circuit to provide substantial lineal potentiometer control for feeding material which consists of a controlled semiconductor rectifier having an anode and a cathode, a gate for said controlled semiconductor rectifier, a pair of diodes having their anodes connected together and to one end of a potentiometer and to one side of a condenser, the other side of said condenser connected to the cathode of said controlled semiconductor rectifier, the cathode of one diode connected to the gate of said controlled semiconductor rectifier, the cathode of the other of said diodes connected to the other end of said potentiometer and to the anode of said controlled semiconductor rectifier, said controlled semiconductor rectifier anode and cathode representing the opposite ends of a parallel circuit, a resistance inserted in said connection between said cathode of said other of said diodes and said anode of said controlled semiconductor rectifier, two terminals representing a source of pulsating supply current, the operating coil of an electromagnetic vibratory feeder having one end connected to one terminal representing a source of current supply and having the other end of said feeder operating coil connected to one end of said parallel circuit, and the other terminal representing a source of pulsating supply current connected to the other end of said parallel circuit.

2. The feeder supply circuit of claim 1 characterized in that said resistance is connected between said other end of said potentiometer and the anode of said controlled semiconductor rectifier.

References Cited by the Examiner

UNITED STATES PATENTS

| | | | |
|---|---|---|---|
| 2,285,434 | 6/1942 | Hittson | 318—127 |
| 3,103,618 | 9/1963 | Slater | 323—22 |
| 3,122,690 | 2/1964 | Dion et al. | 318—132 X |
| 3,147,419 | 9/1964 | Cope | 318—129 |
| 3,179,866 | 4/1965 | Doyle et al. | 318—125 |
| 3,222,583 | 12/1965 | Gutzwiller | 323—22 X |

MILTON O. HIRSHFIELD, *Primary Examiner.*

D. F. DUGGAN, *Assistant Examiner.*